Sept. 22, 1970 MASAJI MOCHIZUKI ET AL 3,530,046
POLAROGRAPHIC ELECTRODE AND METHOD OF USING SAME
Filed Nov. 18, 1968 4 Sheets-Sheet 1
Fig.1
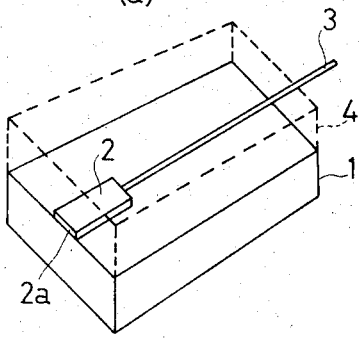
(a)
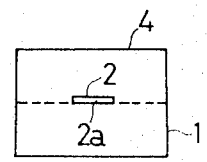
(b)
Fig.2
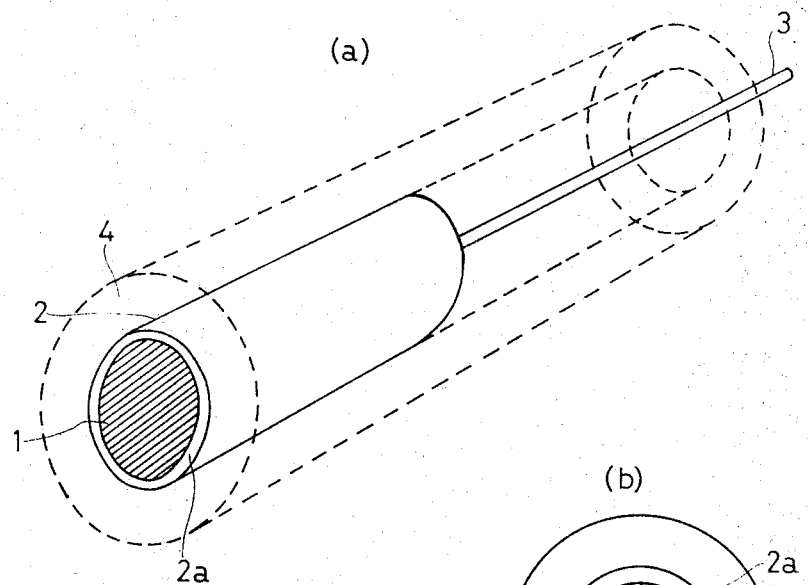
(a)
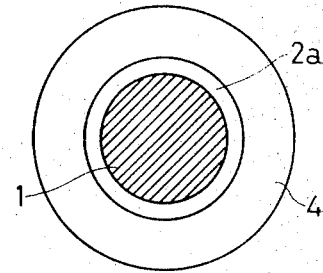
(b)
M. MOCHIZUKI AND Y. SAITO
INVENTORS
By Bierman & Bierman
ATTORNEYS

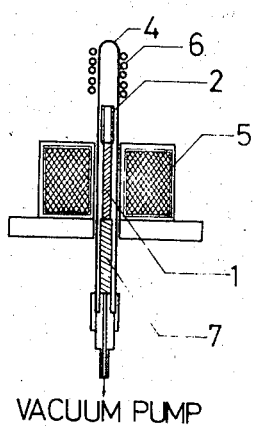
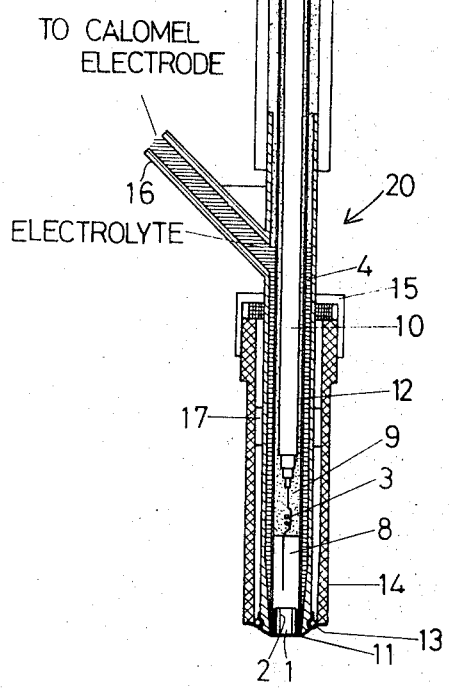
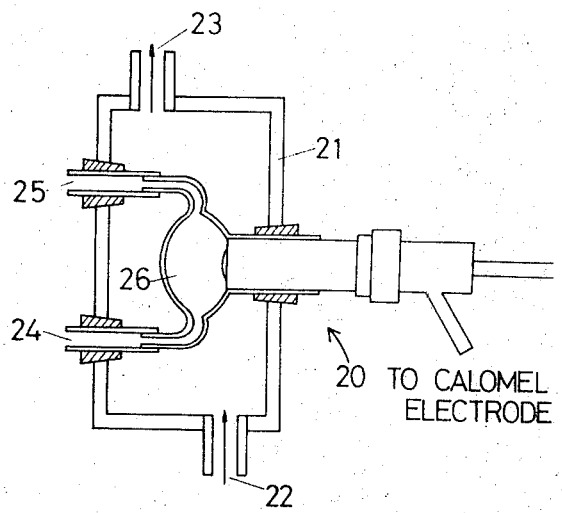

United States Patent Office 3,530,046
Patented Sept. 22, 1970

3,530,046
POLAROGRAPHIC ELECTRODE AND METHOD
OF USING SAME
Masaji Mochizuki, Sapporo, and Yukio Saito, Warabi, Japan, assignors to Sankyo Company Limited, a corporation of Japan
Continuation-in-part of application Ser. No. 442,006, Mar. 23, 1965. This application Nov. 18, 1968, Ser. No. 776,411
Int. Cl. G01n 27/46
U.S. Cl. 204—1         6 Claims

ABSTRACT OF THE DISCLOSURE

A polarographic electrode determines small concentrations of chemicals. An improved electrode includes a film layer embedded in an insulating body, the edge of the film being exposed.

---

Figure 5:
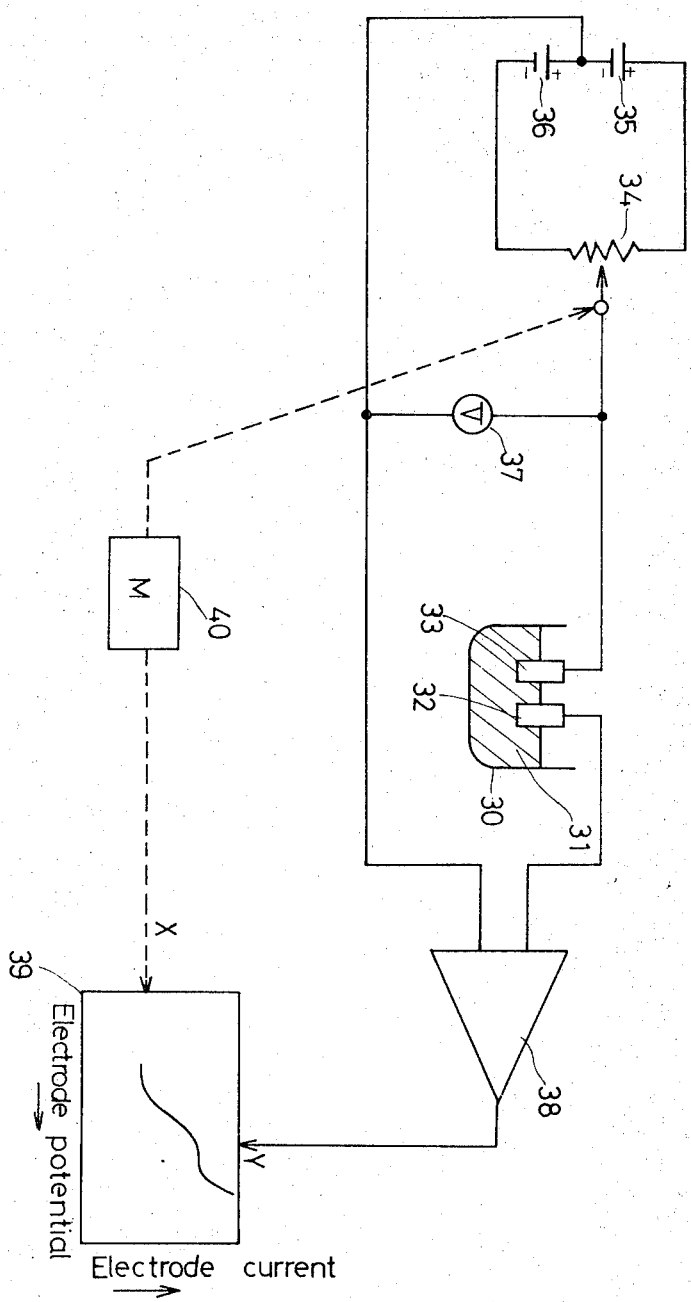

This application is a continuation-in-part of applicants' co-pending application Ser. No. 442,006, Mar. 23, 1965, now abandoned.

The present invention relates to a polarographic electrode or micro-electrode used in a polarograph and to a method for making same.

As known, a polarographic electrode is used to determine a very small concentration of oxidizable or reducible substance by quantitative measurement of the diffusion current which results from the reaction of the substance at either an anode or a cathode. When a solution contains oxygen, for example, whose concentration it is desired to determine, a polarographic electrode is placed in contact with the solution and a counter-electrode is properly arranged. In polarography, it is assumed that the oxygen concentration is uniform throughout the bulk of the solution. Upon application of a voltage across the electrodes, oxygen is converted at the cathode into an ion, which gives rise to an electric current. As the reaction or reduction of oxygen proceeds, the oxygen concentration will be depleted in the vicinity of the cathode, so that there is produced a concentration gradient around the cathode. In the prior art the cathode was often an end section of a thin wire. Because of such gradient, oxygen moves by diffusion from the bulk toward the cathode, and the region of such diffusion is called a diffusion layer. The size of a diffusion layer will be usually given by the distance measured from the center of the electrode surface to a point in a sample solution at which the concentration of reactant is 99%, assuming 100% concentration in the bulk of the solution. The distance is measured in a direction normal to the electrode surface.

Obviously it is desirable to keep the diffusion layer from being influenced or disturbed by the flow of the solution. For this purpose a membrane permeable to reactant or oxygen, in the above example, is usually disposed closely surrounding the polarographic electrode to limit the extent of diffusion. Such membrane of conventional material, for example, polyethylene terephthalate, has more or less resistance to the passage of oxygen therethrough, since the very purpose of the membrane is to delineate the diffusion layer by its own restriction, although the membrane also serves to prevent contamination of the electrode surface by other irrelevant substances. The diffusion layer may be kept small in this way, but because of the restriction, such system cannot have a rapid response. Thus it takes a relatively long time period for a reactant to pass through the membrane and maintain the diffusion layer within the interior of the membrane. For this reason, use of such a restrictive membrane is objectionable where a rapid response is required, as in a running process control.

On the other hand, when a good-permeable membrane such as formed of polytetrafluoroethylene is used, the diffusion layer overgrows it. It is no longer possible to keep the diffusion layer inside the membrane, but the layer extends outside the membrane so that it is disturbed by flow of the solution. In addition, since the oxygen has to reach or supply the diffusion layer by diffusion through the bulk of the solution, the formation of the diffusion layer and hence the diffusion current is influenced by diffusion coefficients of reactant, for example oxygen, with respect to the respective sample solutions as air, water, blood or the like. Thus separate calibration curves must be prepared for individual sample solutions, even though the reactant, oxygen, remains the same. This is cumbersome.

It is known that the diffusion layer can be reduced in size by decreasing the diameter of the thin wire whose end section is used as an active electrode. However, this results in the loss of sensitivity and is therefore undesirable. In addition, an extremely thin wire involves manufacturing difficulties when produced on a commercial basis.

When the end section of a thin wire is used as an active electrode, the size of the diffusion layer is substantially proportional to the diameter of the wire and the diffusion become three-dimensional. Assuming that a solid cylindrical wire of conductive material is arranged recessed in an insulating body with the end section of the wire being retracted from the surface of the body and that an electrolyte including reactant fills the recess to contact the electrode surface, there occurs a linear diffusion in the direction normal to the electrode surface, that is, in the axial direction of the wire. In a linear diffusion, the diffusion extends quite long, theoretically infinite, and requires a long period until it is sufficiently stabilized to allow measurement. When such an electrode is flush with the surface of the body, the diffusion takes place in three dimensions. In other words, surfaces of equi-concentration of reactant will be in the form of concentric semispheres. As mentioned previously, such three-dimensional diffusion involves the problem of the size of the diffusion layer. In fact, it was difficult to obtain a diffusion layer of several microns.

Therefore, it is the principal objective of the invention to provide an improved polarographic electrode which can be used in polarography to avoid the influences of the flow of a sample solution and of different diffussion coefficients of a reactant to various electrolytes and which provides a rapid response while maintaining the desired sensitivity.

It is another objective of the invention to provide a polarographic electrode which allows a two-dimensional diffusion.

According to the invention, there is provided a polarographic electrode comprising as its electrode member a thin film of an electrically conductive material which is embedded as sealed in an insulating material. One face of the thin film is not insulated or sealed and provide an exposed electrode surface. The end face of the electrode surface has a ratio of length to width which is so large that the electrode can be operated so that substantially only a two dimensional diffusion will occur.

The thin film of conductive material may be in any form, provided it is exposed at one of its edges or its end face. Thus the film may be flat or cylindrical in shape, and the effective electrode surface is an end face of the thin film. The length of this electrode surface, which may be of the order of e.g. from 0.1 to 10 mm., is substantially greater than its width or the thickness of the film, such width being not greater than 1 micron, usually from about 0.001 to about 0.1 micron. So it will be appreciated that with such proportions of length to width of the electrode surface, the diffusion layer formed will be two-dimensional. That is to say, there will be no substantial change in the shape of the diffusion layer along the length of the electrode surface. In other words, diffusion occurs substantially only in parallel planes at right angles to the length of the end face. The size or radius of the diffusion layer is governed by the width of the electrode surface. This radius can be reduced to such an extent that the whole diffusion layer is received within a stagnant boundary layer on the electrode. This is possible without accompanying loss of sensitivity, since the width may be reduced as desired to achieve a small diffusion layer, whilst the length may be elongated as desired to maintain the required sensitivity. With the prior art electrode which uses an end section of a platinum wire, both the radius of the diffusion layer and the sensitivity depend on the diameter of the wire. However, it is found that when the end face of a thin film is used as electrode in accordance with the invention, the sensitivity of the electrode does not depend upon the width of the electrode surface or the thickness of the thin film. Thus the width can be reduced without loss of sensitivity. Because the diffusion layer remains within the stagnant boundary layer, the diffusion current is not influenced by flow of the solution and is independent of the varying diffusion coefficients of a reactant to different sample solutions. The term "reactant" is herein intended to mean a substance which is consumed on the electrode surface by the oxidation or reduction reaction. Thus the polarographic electrode according to the invention can be used equally as an anode or cathode.

In accordance with the invention, there is also provided a method of preparing a polarographic electrode which comprises the steps of sealing a lead of an electroconductive material at one end of a cylindrical substrate made of an insulating material, depositing a thin film of an electro-conductive material on the surface of the substrate while rotating the substrate, placing the substrate on which the thin film has been deposited in a tube of insulating material, heating the assembly externally at a temperature just below the deformation temperature of the substrate, and fusing together the thin film and the tube.

Any conventional material may be used in forming the electrode or thin film. Suitable material includes platinum, gold, silver, carbon or the like. The insulating material used for embedding the thin film except its one end face may also be conventional, such as various kinds of glasses, plastic materials or porcelains.

The thin film may be formed by any suitable means including vacuum deposition, sputtering, thermal decomposition, reduction, vapor-phase reaction, electroplating, chemical plating, painting, rolling of the like.

As will be evident from the foregoing, the polarographic electrode of the invention depends for its operation upon the relative proportions of the length to width of the end face of the electroconductive thin film. However, in order to avoid the influence of the flow, it is essential to ensure that the diffusion layer formed is kept small enough to remain within a stagnant boundary layer. This determines the upper limit of the film thickness and the lower limit is governed by the practical requirement to maintain sufficient electrical conductivity of the thin film, since heat treatment used in the process of forming the thin film causes loss of conductivity. Thus the thin film will have a thickness from 0.001 to 1 micron, preferably from 0.025 to 0.3 micron and most preferably about 0.1 micron.

Figure 6:
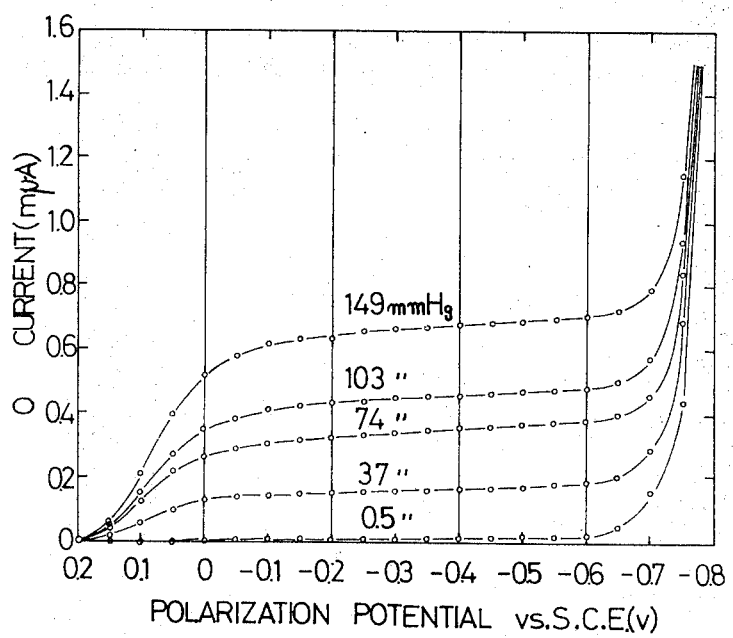

For the better understanding of the invention, it will be described in more detail with reference to the drawings in which FIGS. 1a and 1b are perspective and end views of an embodiment of the invention incorporating a flat electrode film, FIGS. 2a and 2b are similar views showing another embodiment in which a cylindrical thin film is used, and FIG. 3 illustrates a preferred method of fusing a film-sputtered substrate into a glass tube, and FIG. 4A is a longitudinal section through an electrode assembly using the electrode formed in the manner shown in FIG. 3, and FIG. 4B is a schematic view illustrating how the electrode assembly of FIG. 4A is arranged for operative association with a specimen to be examined, and FIG. 5 is a circuit diagram of an electrical connection of a polarograph using the polarographic electrode of the invention, and FIG. 6 is a graph showing results of $O_2$-measurement with the polarographic electrode of the invention.

Referring to FIG. 1, the polarographic electrode shown includes a base 1 of an insulating material on the top surface of which is provided a flat thin film 2 of electro-conductive material. The thin film 2 may be applied by vacuum deposition, thermal decomposition, electrodeposition or rolling. A lead 3 is provided on the base 1 and is electrically connected with one end of the film 2. A cover member 4 of an insulating material is placed on the film and the base and secured and sealed to the base. The film 2 is positioned so that it is entirely embedded in the insulating material except its one end face 2a, which is exposed for contact with a specimen to be examined.

FIG. 2 shows another embodiment of the invention in which a base or substrate of insulating material is cylindrical in shape. An electrode member formed by the thin film 2 of a conductive material is also cylindrical and is embedded, in a sealed relationship, between the substrate 1 and an outer cover tube 4 of insulating material, except that its one end face 2a is exposed. The material for the tube 4 should have a softening point lower than that of the material for the substrate 1. Preferably, such electrode is prepared as follows: A platinum or other suitable metal lead 3 is sealed on a soda lime glass cylinder 1 by application of heat, and then platinum is deposited on one end portion of the substrate, by vacuum evaporation, while rotating the substrate. The length of the lead is chosen sufficient to make an electrical connection with the platinum film when deposited. The platinum-deposited substrate is placed in a lead glass tube 4 having an inner diameter slightly in excess of the outer diameter of the substrate. The tube 4 is positioned to expose the end face 2a of the film flush with the end faces of the substrate 1 and the tube 4. The assembly is then heated to a temperature just below the deformation temperature of the substrate glass, whereby the thin film 2 and the lead glass tube 4 are welded together. The assembly is gradually cooled, and the left-hand end of the electrode, as viewed in FIG. 2a, is ground until a fresh end face is exposed. Subsequently the end face is finished by buffing.

In one example, a Pyrex glass rod, Corning #7740, 3 mm. $\phi$ and 10 mm. long and having a softening point of 820 C. was used as a substrate together with a cylindrical tube of Pyrex glass having outer diameter of 5 mm., inner diameter of 3.4 mm. and length of 100 mm. as an outer cover tube. In another example, the substrate comprised a soda lime glass, Corning #008, having a softening temperature of 695° C. and the outer cover tube comprised lead potash, Corning #8161, having a softening point of 600° C. The dimensions remain unchanged. In an example, the number of rotations of the substrate during deposition was nearly 20 r.p.m.

In a further example a platinum thin film 0.1 micron thick was sputtered from a platinum cathode located 100 mm. above a horizontally disposed Pyrex glass rod 3 mm. in diameter and 170 mm. long, the cathode and the rod being placed in a bell jar evacuated and filled with argon gas to a pressure of about $10^{-2}$ mm. Hg. The cathode was covered on the side remote from the rod with a glass shield to avoid undesired discharge, and a high tension voltage was applied between the cathode and a counterelectrode placed below the rod to produce a discharge current of about 40 ma., which continued for 30 minutes. During the discharge, the rod was kept rotating at 18 r.p.m. The glass rod was previously formed with peripheral notches every 10 mm. along its length to facilitate dividing the rod into smaller pieces. A divided sample of the sputtered rod 10 mm. long was fused with a Pyrex glass tube. A preferred arrangement for fusing the sputtered rod with the glass tube will be described with reference to FIG. 3. The tube was held vertically to extend through a solenoid coil and surrounded by an electrical heater at its top. The tube was open at its lower end and was connected with a vacuum pump. To the bottom of the rod was attached an iron rod and the rod was inserted into the tube to a position where the rod lay just beneath the heater. Then both the heater and the coil were energized. When the glass tube softened, the solenoid pulled the iron rod upward to drive the rod into the heated part of the tube, whereupon the pump was operated to withdraw air from the interior of the tube, thereby causing the tube to shrink and engage the rod firmly. After the rod had completely engaged within the top end of the tube, the current supply to the heater was reduced stepwise for a period of 30 minutes to remove strain in the glass tube. Upon cooling, the top end of the tube was cut open and ground initially with carborundum and then polished with optical emery in water. Polishing in air is objectionable because of cracks which are produced in the film formed.

The sputtered electrode thus formed may be used to construct an electrode assembly 20 as shown in FIG. 4A. A copper wire 3 is connected at one end to the sputtered film 2 by using a conductive adhesive 8 and is held in place with epoxy resin filler 9. The other end of the wire 3 is connected to a conductor 10 such as a shielded wire which extends through thte glass tube 4 for external connection. The electrode surface or the bottom of the glass tube 4 is covered by a membrane 11 of polytetrafluoroethylene, Teflon, (trademark) of Du Pont, 6 microns thick. The tube 4 is received in a mantle member 12 of acryl resin which is clamped at its bottom together with the membrane 11 against the tube 4 by an O-ring 13. The arrangement is such that there is provided a ground joint between the mantle member 12 and the glass tube 4 which permits a film of an electrolyte, admitted between the parts 4, 12, to extend therethrough for electrical connection with a film of the electrolyte that is formed between the membrane 11 and the bottom ends of the parts 4, 12. Finally, the structure described thus far is fitted into an outer mantle member 14 of acryl resin and the assembly is locked by tightening a nut 15 which engages threads formed on the outer surface of the member 14 at its top. In addition, the innermantle member 12 is connected with a tube 16 which is connected to a reference electrode such as calomel electrode. In order to avoid twisting of the membrane 11 which is found to occur when engaging the both mantle members 12, 14, the outer member 14 is provided with a key 17 which engages a keyway provided in the exterior surface of the inner member 12.

In use, such electrode assembly 20 is placed in a thermostatic bath or chamber 21 (FIG. 4B) having an inlet 22 and an outlet 23 for circulation of suitable medium, for example, water. The chamber 21 has a pair of sample inlet ports and outlet ports, respectively 24, 25 which are connected to a sample cell 26. It will be understood that the sample in the cell 26 is brought into contact with the end face of the sputtered film 2 through the membrane 11.

The electrical connection of the electrode assembly may be made in various ways depending upon the particular application. FIG. 5 shows in block diagram an example of a circuit arrangement which may be used to determine the presence of a reactant or reactants in a sample solution and their concentration. Referring to this FIG. 5, there is provided a polarographic cell 30 containing an electrolyte specimen 31 to be examined which includes a supporting salt. An electrode 32 according to the invention, which may be of either form shown in FIG. 1 or 2, is immersed into the electrolyte together with a reference electrode 33 which may be a calomel electrode. It should be understood that the electrode 32 extends into the electrolyte to a certain depth, but the electroconductive thin film 3 (FIGS. 1 and 2) is totally sealed in insulating material except its end face $2a$. In order to apply across the cell a voltage which varies from $-2$ v. to $+2$ v., for example, the reference electrode 33 is connected to a movable point or slider on a potentiometer 34 which is connected across a pair of batteries 35, 36. Across the movable point and the junction between the batteries 35, 36 is connected a voltmeter 37 to indicate the voltage across the cell. The thin film electrode 32 and the junction between the batteries are connected to a D.C. current amplifier 38 which is adapted to operate on an input current level of from 0.0001 to 100 microamperes, for example. The output of the amplifier 38 is connected to an X–Y recorder 39 to provide a Y-input. In addition, there is provided a reversible motor 40, which moves the slider on the potentiometer 34. The motor also drives the recording chart in the recorder 39, thereby providing an X-input thereto. However, it should be understood that the recording may be effected in any known manner.

Using the system generally illustrated in FIGS. 4 and 5 with an electrolyte which comprised saturated KCl and borax solution which was kept at 37° C., current-voltage curves were taken, by varying the polarizing potential stepwise by 50 mv., at five levels of $O_2$ tension, 0.5, 37, 74, 103 and 149 mm. Hg. The results are shown in FIG. 6, in which the sharp rise at the right-hand end corresponds to the evolution of hydrogen which occurred at the potential of $-0.7$ volt with respect to the calomel reference electrode used. The curves indicate that the diffusion current due to oxygen always starts to rise at $+0.2$ volt with respect to the calomel electrode. To keep the electrolyte balanced, a $N_2$–$O_2$ mixture gas was supplied to the cell, but the measurement can be continued during such supply. With the prior art polarographic electrode, the supply had to be interrupted and the electrolyte kept still before measurement can be made.

The polarographic cell according to the invention can also be used in the monitoring of a running process. In this instance, the electrode potential need not be varied, but is maintained at a constant value which depends upon a particular reactant to be monitored. Furthermore, it will be appreciated that the polarographic electrode according to the invention is directly applicable to known polarographs using A.C., square wave, high frequency or pulse voltage.

One advantage with the manufacturing of the polarographic electrode of the invention is that because of the extreme thinness of the film, some flexibility is obtained to accommodate for the difference of the coefficients of thermal expansion between the film material and the insulating material. This ensures a good seal between these minerals and prevents ingress of an electrolyte in use which would give rise to a residual current that represents an error in measurement. Such flexibility also avoids difficulties experienced in the selection of conductive and insulating materials to be used in combination. Another advantage results from good workability of the electrode member and its end face can be ground to provide a clean and smooth surface without causing deformation. Finally, sufficient mechanical support for the electrode can be assured with a simple construction.

The polarographic electrode according to the invention does not require a membrane which is usually provided for the purpose of restricting the diffusion layer. When the electrode is used with a supporting electrolyte-free test sample such as gaseous or oily substance, it should preferably be covered with a similar membrane, but the membrane may be made fully permeable to a reactant so as to avoid time delay of response, since the only purpose of providing such membrane is to filter contaminants.

If desired, the electrode structures shown in FIGS. 1 and 2 may be superimposed one above another by repeating similar processes, whereby an increased sensitivity may be obtained as a result of increased total area of the electrode surface.

What is claimed is:

1. A polarographic electrode comprising as its electrode member a thin film of an electrically conductive material, an insulating material embedding and sealing said electrode member except for one end face of the thin film which provides an exposed electrode surface and an electrical lead contacting said film within the insulating material and extending outwardly therefrom.

2. A polarographic electrode according to claim 1, in which the end face has a width from 0.001 to 1 micron.

3. A polarographic electrode according to claim 2, in which said width is in the range from 0.025 to 0.3 micron.

4. A polarographic electrode according to claim 1, in which said thin film is sandwiched between a pair of flat plates of insulating material with said end face being flush with the end faces of the flat plates.

5. A polarographic electrode according to claim 1, in which said thin film is of cylindrical form, thereby providing the electrode surface which is annular in shape.

6. A method of determining the concentration of an oxidizable or reducible substance in a medium, comprising the steps of providing a pair of electrodes for contact with the medium, one of the electrodes being a reference electrode and the other comprising a thin film of an electroconductive material which is embedded and sealed in insulating material except for one end face of the thin film which provides an exposed electrode surface, applying a voltage across the electrodes to cause diffusion of the substance toward said thin film electrode as a result of an electrode reaction thereon, and observing an electric current which results from said reaction.

References Cited

UNITED STATES PATENTS

| | | | |
|---|---|---|---|
| 595,485 | 12/1897 | Lamb | 161—196 |
| 3,088,905 | 5/1963 | Glover | 204—195 |

TA-HSUNG TUNG, Primary Examiner

U.S. Cl. X.R.

204—195, 286, 297